United States Patent
Terashima

(10) Patent No.: US 7,924,877 B2
(45) Date of Patent: Apr. 12, 2011

(54) COMMUNICATION CONTROL METHOD, COMMUNICATION APPARATUS, AND COMMUNICATION SYSTEM

(75) Inventor: Toru Terashima, Kanagawa (JP)

(73) Assignee: Sony Corporation (JP)

( * ) Notice: Subject to any disclaimer, the term of this patent is extended or adjusted under 35 U.S.C. 154(b) by 169 days.

(21) Appl. No.: 12/313,968

(22) Filed: Nov. 25, 2008

(65) Prior Publication Data

US 2009/0147801 A1 Jun. 11, 2009

(30) Foreign Application Priority Data

Dec. 6, 2007 (JP) ................................ P2007-316210

(51) Int. Cl.
*H04J 3/22* (2006.01)
(52) U.S. Cl. ........................................................ 370/468
(58) Field of Classification Search .......... 370/229–235, 370/238, 238.1, 334, 339, 351–356, 395.5, 370/395.52, 400–402, 463
See application file for complete search history.

(56) References Cited

U.S. PATENT DOCUMENTS

| | | | |
|---|---|---|---|
| 7,440,443 B2 * | 10/2008 | Logvinov et al. | 370/352 |
| 2004/0148632 A1 | 7/2004 | Park et al. | |
| 2004/0174853 A1 * | 9/2004 | Saito et al. | 370/338 |
| 2005/0185621 A1 | 8/2005 | Sivakumar et al. | |
| 2006/0098722 A1 * | 5/2006 | Tanaka et al. | 375/211 |
| 2006/0221987 A1 * | 10/2006 | Polson | 370/402 |

FOREIGN PATENT DOCUMENTS

| | | |
|---|---|---|
| JP | 2007-060494 A | 3/2007 |
| JP | 2007-527170 A | 9/2007 |
| WO | 2007/059037 A2 | 5/2007 |

OTHER PUBLICATIONS

English Translation of Japanese Office Action issued on Oct. 20, 2009, issued in Japanese Patent Application No. 2007-316210.
Yamamoto, Kin, Yamaguchi, Kohana Study of communication channel quality necessary for QoS path control through plural base stations using a congnitive wireless network experimental device, Institute of Electronics, Information and Communication Engineers technical study reports vol. 107 No. 39 IEICE Technical Report, Japan Corporate judicial person Institute of Electronics, Information and Communication Engineers The Institute of Electronics, Information and Communication Engineers, May 10, 2007, vol. 107, pp. 27-32.
European Search Report, EP 08253616, dated Nov. 10, 2009.

* cited by examiner

*Primary Examiner* — Frank Duong
(74) *Attorney, Agent, or Firm* — Lerner, David, Littenberg, Krumholz & Mentlik, LLP

(57) ABSTRACT

Disclosed herein is a communication control method employed by a communication apparatus that includes a primary communication interface and a plurality of relay communication interfaces and has a communication interface coupling function of transferring a transmission/reception frame of the primary communication interface through one of the plurality of relay communication interfaces. The method includes the steps of: acquiring traffic information concerning the primary communication interface; and dynamically varying a transfer allocation ratio between the plurality of relay communication interfaces based on the traffic information.

8 Claims, 5 Drawing Sheets

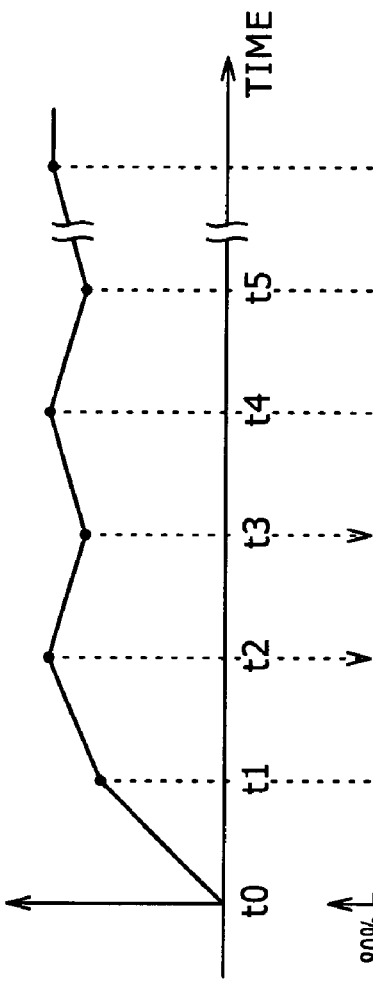
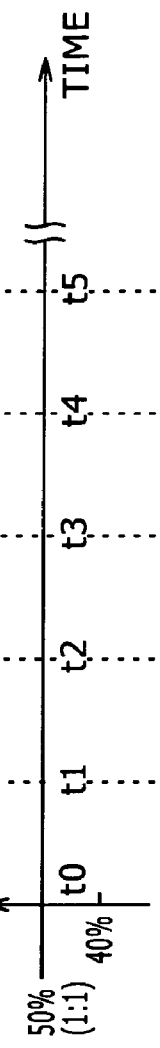
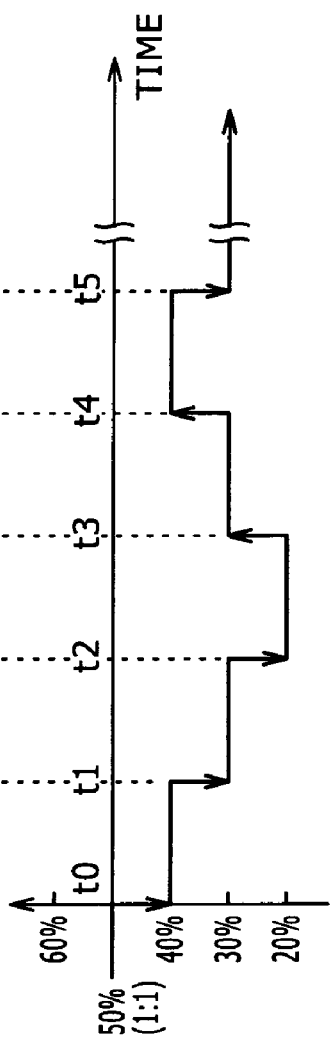
FIG. 5A  PRIMARY IF TRAFFIC VOLUME
FIG. 5B  RELAY IF-A
FIG. 5C  RELAY IF-B

COMMUNICATION CONTROL METHOD, COMMUNICATION APPARATUS, AND COMMUNICATION SYSTEM

CROSS REFERENCES TO RELATED APPLICATIONS

The present application claims priority from Japanese Patent Application No. JP 2007-316210, filed in the Japanese Patent Office on Dec. 6, 2007, the entire content of which is incorporated herein by reference.

BACKGROUND OF THE INVENTION

1. Field of the Invention

The present invention relates to a communication control method, a communication apparatus, and a communication system. In particular, the present invention relates to a communication apparatus, a communication system, and a communication control method employed in a communication interface coupling apparatus that includes a primary communication interface and a plurality of relay communication interfaces and which transfers a transmission/reception frame of the primary communication interface (i.e., a frame received and transmitted by the primary communication interface) through one of the plurality of relay communication interfaces.

2. Description of the Related Art

In recent years, use of information providing services built on wide area networks typified by the Internet has become widespread, and download of large-size data files, delivery of video streams, and so on have become common. In addition, building a network system such as a local area network (LAN) in homes has become common, in which data communication is performed between devices, such as a television receiver and audio equipment, having a data communication function.

In the case where such a network system is built in the home using a wired network, such as an Ethernet (registered brand) network, it is necessary to connect the devices to each other using a data communication cable, that is, a trouble of wiring exists, and it is necessary to take measures to hide the cable to make the home look pleasing.

As such, it has become common to build a wireless network system using an IEEE 802.11-compliant wireless communication system or the like, for example.

Power line communication (PLC) is also known as a technology for building a network in a building. In the power line communication, devices that are supplied with power via a power line and which have a communication capability to communicate with each other via the power line by superimposing a communication signal upon the power line.

While wired LANS typified by the Ethernet (registered brand) LANS offer a transmission rate of more than 100 Mbps, the construction of the wired LANS in the homes is not so widespread as in offices. As a substitute, use of wireless LANS, power line communication LANS, and the like, which are easy to construct, has been becoming widespread. However, the wireless LANS, power line communication LANS, and the like have a drawback such as unstable communication quality compared to the wired networks, and still have many problems to be solved to accomplish stable, high-quality transmission of a large amount of data.

IEEE 802.3ad link aggregation or the like has standardized a technology of virtually grouping a plurality of physical interfaces as one logical link to increase the bandwidth in order to achieve high-capacity and high-quality transmission with easy implementation. In connection with this technology, several methods have been devised for determining a path, i.e., one of the plurality of physical interfaces, to which data should be transmitted, in order to secure higher communication quality.

JP-A-2007-60494 and JP-T-2007-527170 disclose methods for determining the path to which the data should be transmitted, as related-art techniques.

SUMMARY OF THE INVENTION

In the techniques as described in JP-A-2007-60494 and JP-T-2007-527170 mentioned above, which are different in several respects but basically similar, characteristic information concerning each of the plurality of paths is obtained, and based on these pieces of information, the optimum path is dynamically determined from among the plurality of paths. Examples of such information include time stamps, a throughput, and information about the communication quality typified by packet loss information.

In the above methods, however, it is necessary to acquire the information concerning each of the plurality of physical interfaces, in order to determine the state of communication in each of the plurality of physical interfaces. Accordingly, while the above methods might be effective when applied to a large-scale router for business use or the like in particular, these methods require complicated processing when constantly monitoring the information concerning each of the plurality of paths and determining the optimum path. In this sense, these methods are overdesigned for application to a simple home-use communication apparatus, causing an extra cost.

The present invention addresses the above-identified, and other problems associated with conventional methods and apparatuses, and provides a communication control method, a communication apparatus, and a communication system which allow a communication interface coupling apparatus that includes a primary communication interface and a plurality of relay communication interfaces, and which transfers a transmission/reception frame of the primary communication interface through one of the plurality of relay communication interfaces to allocate transmission/reception frames among the plurality of relay communication interfaces appropriately, without the need for a complicated mechanism, to secure higher communication quality.

According to one embodiment of the present invention, there is provided a communication control method employed by a communication apparatus that includes a primary communication interface and a plurality of relay communication interfaces and has a communication interface coupling function of transferring a transmission/reception frame of the primary communication interface through one of the plurality of relay communication interfaces, the method including the steps of: acquiring traffic information concerning the primary communication interface; and dynamically varying a transfer allocation ratio between the plurality of relay communication interfaces based on the traffic information.

According to another embodiment of the present invention, there is provided a communication apparatus including: a primary communication interface; a plurality of relay communication interfaces; and a control section configured to acquire traffic information concerning the primary communication interface, and dynamically vary a transfer allocation ratio between the plurality of relay communication interfaces based on the traffic information. The communication apparatus has a communication interface coupling function of transferring a transmission/reception frame of the primary communication interface through one of the plurality of relay communication interfaces.

According to yet another embodiment of the present invention, there is provided a communication system including two or more communication apparatuses, each of the two or more communication apparatuses including: a primary communication interface; a plurality of relay communication interfaces; and a control section for acquire traffic information concerning the primary communication interface, and dynamically vary a transfer allocation ratio between the plurality of relay communication interfaces based on the traffic information. Each of the two or more communication apparatuses has a communication interface coupling function of transferring a transmission/reception frame of the primary communication interface through one of the plurality of relay communication interfaces. Each of the plurality of relay communication interfaces of each of the two or more communication apparatuses is connected to a corresponding one of the plurality of relay communication interfaces of another of the two or more communication apparatuses.

According to the embodiments of the present invention, the transfer allocation ratio between the plurality of relay communication interfaces is dynamically varied based on the traffic information concerning the primary communication interface. Thus, it is possible to allocate transmission/reception frames among the plurality of relay communication interfaces appropriately to secure higher communication quality, without the need to acquire traffic information concerning the plurality of relay communication interfaces individually or the need for a complicated mechanism.

BRIEF DESCRIPTION OF THE DRAWINGS

FIGS. 5A to 5C are time charts illustrating an example of the operation of the flowchart of FIG. 4.

DETAILED DESCRIPTION OF THE PREFERRED EMBODIMENTS

Hereinafter, specific embodiments of the present invention will be described in detail with reference to the accompanying drawings.

Figure 1:
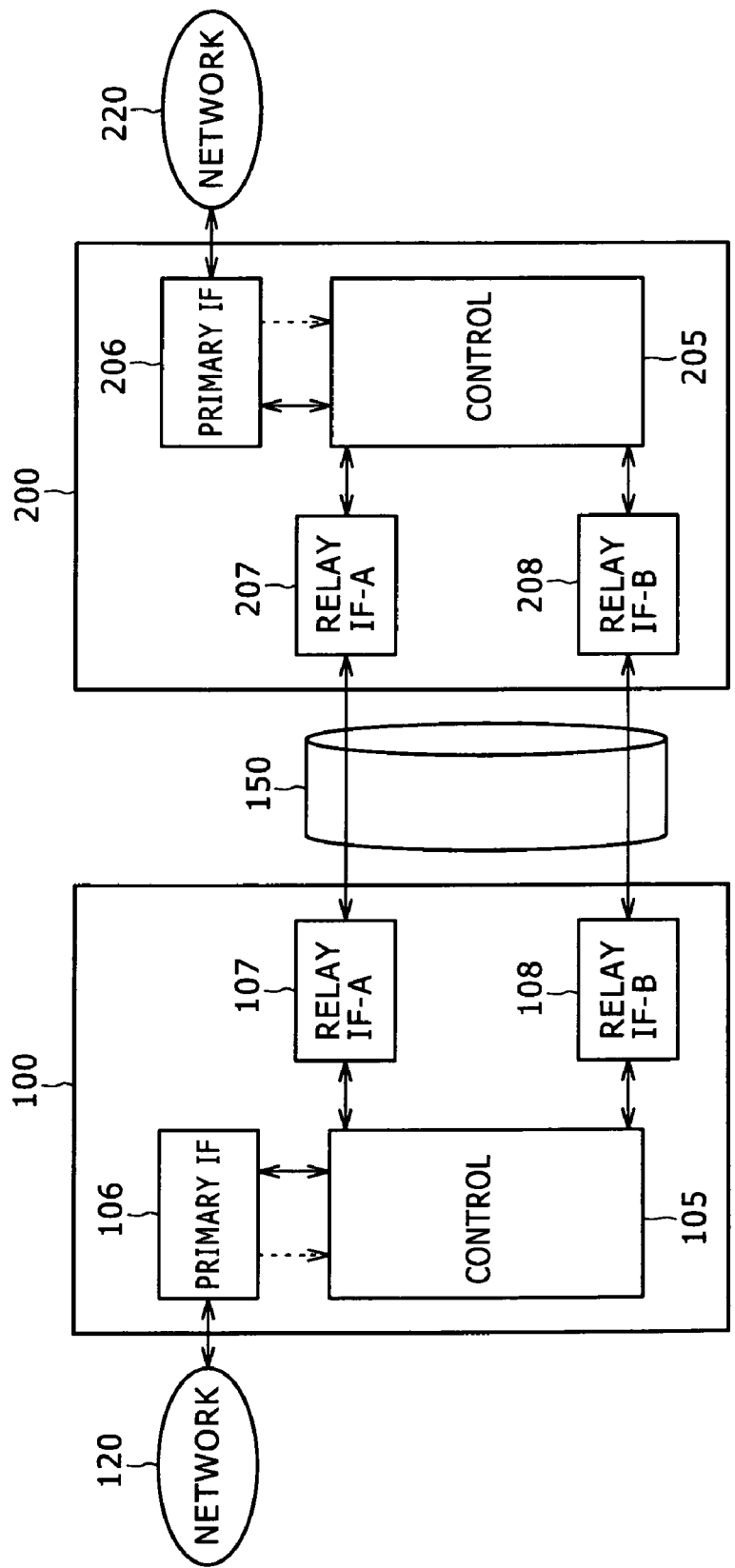
FIG. 1 is a block diagram illustrating a schematic structure of a communication system using a communication interface coupling apparatus according to one embodiment of the present invention.

FIG. 1 is a block diagram that schematically illustrates a communication system using a communication interface coupling apparatus (a bridge apparatus) as a communication apparatus according to one embodiment of the present invention.

In FIG. 1, a communication interface coupling apparatus 100 includes: a control section 105 for at least performing communication control; a primary communication interface (hereinafter referred to as a "primary interface" or a "primary IF" as appropriate) 106 that is connected to a primary communication network 120 such as the Internet; and a plurality of relay communication interfaces (hereinafter referred to as "relay interfaces" or "relay IFs" as appropriate), i.e., two relay communication interfaces (a relay IF-A 107 and a relay IF-B 108) in this embodiment. The communication interface coupling apparatus 100 is applied, for example, as a bridge apparatus having a bridge function, such as a router used in a home. The communication interface coupling apparatus 100 is connected to a communication interface coupling apparatus 200 having a similar structure directly or indirectly via a communication path of a relay section 150.

Similarly, the communication interface coupling apparatus 200 includes: a control section 205 for at least performing communication control; a primary communication interface (i.e., a primary IF) 206 that is connected to a primary communication network 220 such as the Internet; and two relay communication interfaces (a relay IF-A 207 and a relay IF-B 208). In this case, the relay IF-A 107 of the communication interface coupling apparatus 100 communicates with the relay IF-A 207 of the communication interface coupling apparatus 200, while the relay IF-B 108 of the communication interface coupling apparatus 100 communicates with the relay IF-B 208 of the communication interface coupling apparatus 200.

In this embodiment of the present invention, the control section 105 of the communication interface coupling apparatus 100 acquires traffic information concerning the primary communication interface (i.e., the primary IF 106) (as indicated by a broken-line arrow in the figure), and, based on the traffic information, dynamically varies a transfer allocation ratio, i.e., a ratio of allocation between the relay communication interfaces (i.e., the relay IF-A 107 and the relay IF-B 108). Meanwhile, the control section 205 of the communication interface coupling apparatus 200 acquires traffic information concerning the primary communication interface (i.e., the primary IF 206) (as indicated by a broken-line arrow in the figure), and, based on the traffic information, dynamically varies a transfer allocation ratio between the relay communication interfaces (i.e., the relay IF-A 207 and the relay IF-B 208).

Next, referring to FIG. 2, an exemplary internal structure of the communication interface coupling apparatus 100 will now be described below. Note that because the communication interface coupling apparatus 200 has a similar structure, illustration and description thereof are omitted.

Figure 2:
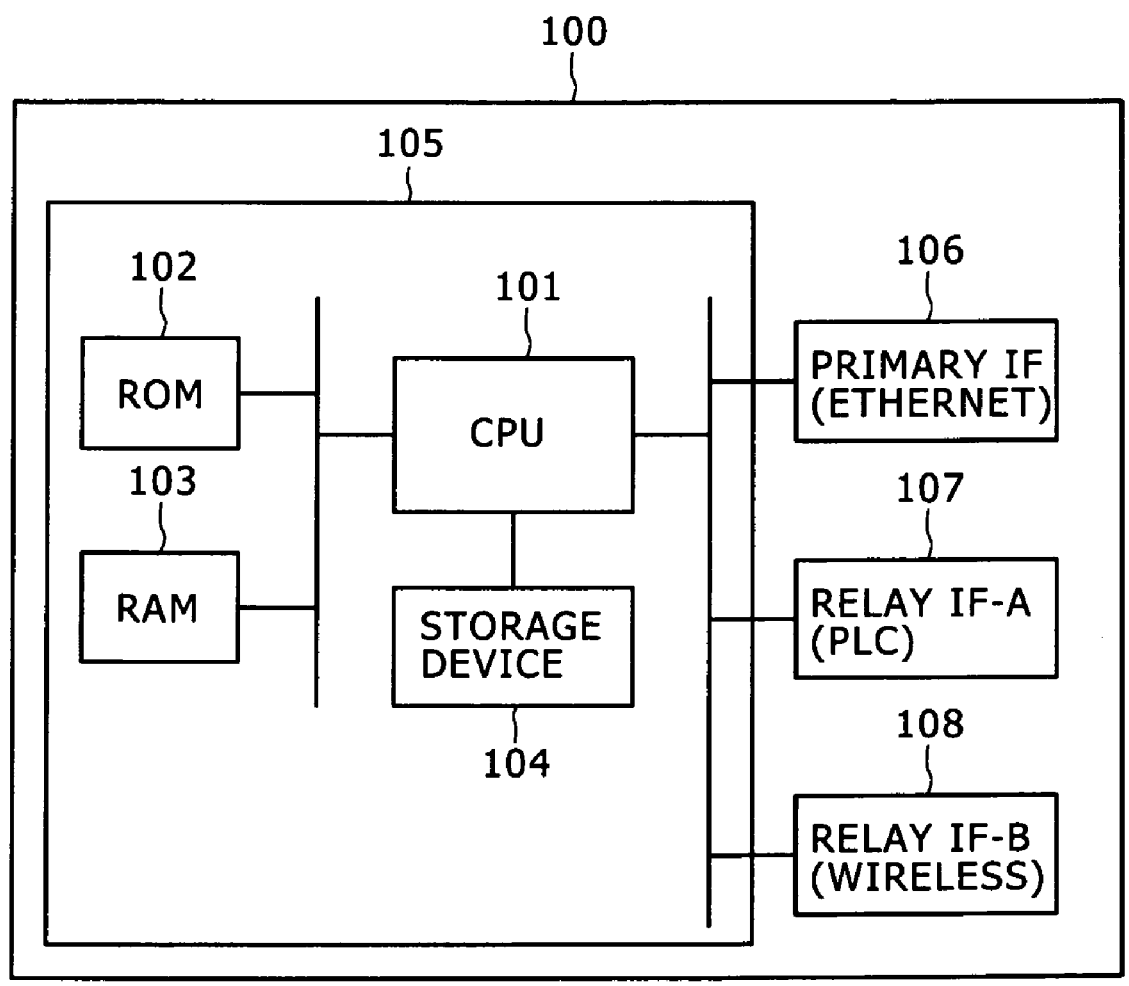
FIG. 2 is a block diagram illustrating an exemplary internal structure of the communication interface coupling apparatus according to one embodiment of the present invention.

In FIG. 2, the communication interface coupling apparatus 100 includes the control section 105, the primary communication interface (i.e., the primary IF) 106, and the two relay communication interfaces, i.e., the relay IF-A 107 and the relay IF-B 108, as described above. The control section 105 includes a central processing unit (CPU) 101, a read-only memory (ROM) 102, a random access memory (RAM) 103, and a storage device 104.

The CPU 101 executes specified program codes to perform centralized control over an overall operation of the communication interface coupling apparatus 100 with software processing. The ROM 102 stores an initial boot program, initially activated data, and so on fixedly. The RAM 103 is a main memory. The CPU 101 performs a variety of processes in accordance with a program in the RAM 103. The storage device 104 is formed by a hard disk, a large-capacity flash memory, any of a variety of memory cards, or the like. The storage device 104 is used to store a file of an additional software program, data, or the like, for example.

The control section 105 at least has a function of measuring and acquiring the traffic information such as the number of transmission/reception frames (the number of packets) or a transfer rate at the primary communication interface (i.e., the primary IF) 106, and determining and controlling the allocation ratio between the relay communication interfaces (i.e., the relay IF-A 107 and the relay IF-B 108) based on the traffic information and so on.

Specific examples of the acquisition of the traffic information include: measuring a transfer rate at which frames (i.e., reception frames) are received from the network; measuring the number of reception frames transferred from the network to the relay communication interfaces through the primary communication interface; measuring a transfer rate at which frames (i.e., transmission frames) are transmitted to the network; and measuring the number of transmission frames transmitted to the network through the primary communication interface. Here, the transmission frames and the reception frames are units for data communication. Instead of the number of frames, the number of packets may be measured for the acquisition of the traffic information, for example.

The control of the transfer allocation ratio between the relay communication interfaces (i.e., the relay IF-A 107 and the relay IF-B 108) may be performed by referring to fluctuation of the traffic information only, for example. Alternatively, it may be so arranged that the transfer allocation ratio starts with an arbitrary initial value and is caused to increase or decrease recursively based on a change in the fluctuation of the traffic information. For example, the transfer allocation ratio may be controlled in such a manner that when a traffic volume of the primary communication interface (i.e., the primary IF 106) has increased after the transfer allocation ratio between the relay communication interfaces was varied in one direction, the transfer allocation ratio is varied in the same direction the next time the transfer allocation ratio is varied, whereas when the traffic volume of the primary communication interface has decreased after the transfer allocation ratio was varied in one direction, the transfer allocation ratio is varied in the opposite direction the next time the transfer allocation ratio is varied. Alternatively, the transfer allocation ratio between the relay communication interfaces may be determined based on the size of the reception frames as received by the primary communication interface (i.e., the primary IF 106). Still further, the allocation ratio may be determined at random when it takes a long time until optimum traffic is achieved, for example.

Note that the internal structure of the control section 105 is not limited to the structure as illustrated in FIG. 2, and that the control section 105 does not need to include all the blocks as illustrated in FIG. 2 as long as an equivalent function is fulfilled. For example, all the blocks as illustrated in FIG. 2 may be integrated into a single integrated circuit, and this single integrated circuit may be adopted as the control section 105.

As the primary communication interface (i.e., the primary IF) 106, a wired LAN interface, such as an Ethernet (registered brand) interface, may be used, for example. As the relay communication interfaces (i.e., the relay IF-A 107 and the relay IF-B 108), a power line communication (PLC) interface, an IEEE 802.11-compliant wireless LAN interface, or the like may be used.

A communication system using the power line communication exhibits different behaviors depending on a structure of a building in which the communication is performed, and is subject to influence of noise caused due to a life rhythm. As such, the communication interface coupling apparatus as the bridge apparatus according to this embodiment of the present invention is configured to perform the communication using a composite bridge function of relaying the communication using combined media of a wireless transmission path and a power line transmission path.

Wireless communication is subject to influence of interference from another system that uses an identical frequency channel. In addition, in the wireless LAN, transmission output is limited because of legal regulations related to radio waves and in order to avoid interference with another system, for example, and thus a communication range is limited and communication between different rooms may be impossible because of presence of a wall therebetween. Meanwhile, in the case of the power line communication, an existing facility can be used to realize communication between different rooms, but the power line communication exhibits different behaviors depending on the structure of the building, and is subject to the influence of the noise (e.g., noise cased by plugging in and out of a cord, use of a dryer, etc.) caused due to the life rhythm.

In contrast, in the communication system that relays data transfer using the communication interface coupling apparatuses connected to each other via two or more transmission media, the communication interface coupling apparatus is capable of, by combining or selecting the transmission media, realizing efficient data transfer while allowing high-speed communication and securing high communication quality in accordance with a transfer mode and a communication condition. If the communication interface coupling apparatus allocates pieces of data to be transferred to the wireless transmission path and the power line transmission path alternately, a transfer speed will be increased as compared to when only one of the transmission media is employed. Such a manner of data transfer is therefore suitable for download of large-size data, such as high definition video signals, from a server to an information terminal, for example, and also for applications that require isochronous transfer, such as video streaming.

In addition, it is possible to more easily determine, from among the plurality of relay communication interfaces, the path to which the data should be transmitted, and control the allocation of the data between the relay communication interfaces in order to secure higher communication quality. In this case, without the need to acquire the traffic information concerning each of the relay interfaces individually, the traffic information concerning the primary interface alone is acquired, and based on this traffic information, the transfer allocation ratio between the relay communication interfaces is dynamically varied so as to achieve appropriate allocation, whereby higher communication quality is secured. That is, the transfer allocation ratio between the relay communication interfaces is varied, and a resulting change in, for example, the traffic volume of the primary interface is checked, and based on this change, the direction in which the transfer allocation ratio is varied is controlled so that the traffic volume will increase. This control is performed recursively, whereby the transmission/reception frames are allocated appropriately between the relay communication interfaces.

Figure 3:
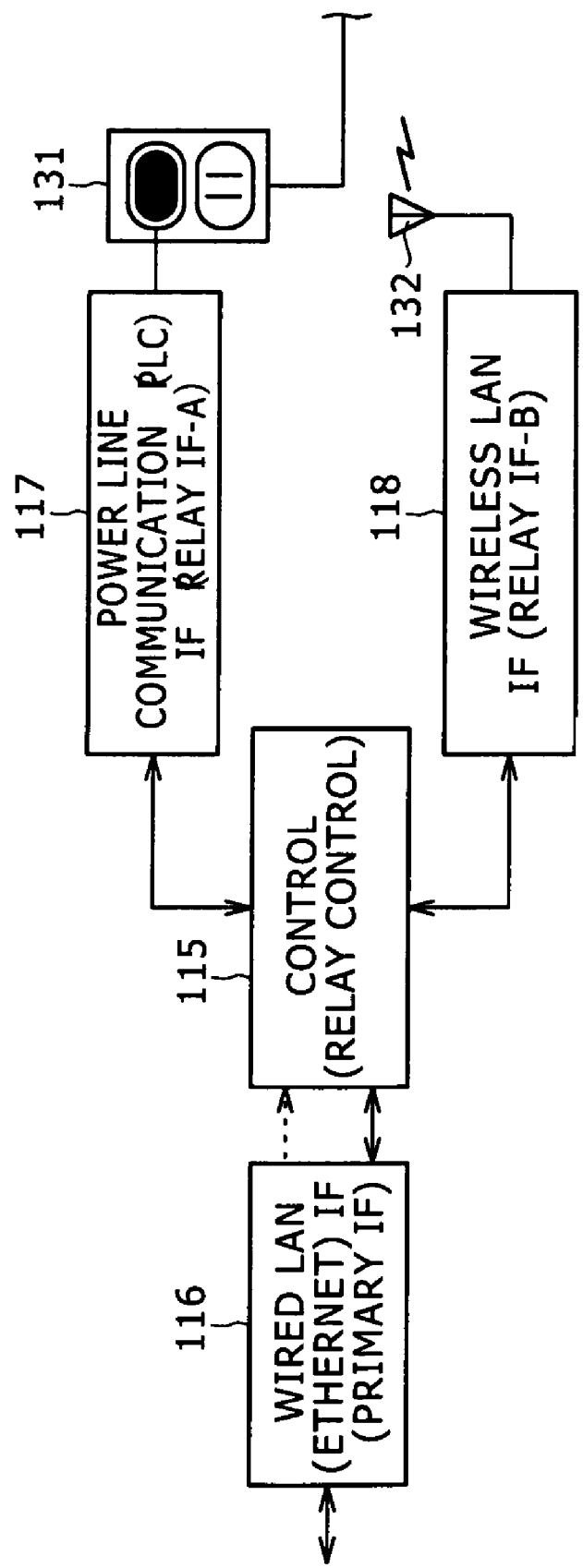
FIG. 3 is a block diagram illustrating a specific example of the structure of the communication interface coupling apparatus.

FIG. 3 is a block diagram illustrating a specific example of a communication interface coupling apparatus that employs a wired LAN IF 116, such as an Ethernet (registered brand) interface, as the primary communication interface (i.e., the primary IF), and employs a power line communication (PLC) IF 117 and a wireless LAN IF 118 as the relay communication interfaces (i.e., the relay IF-A and the relay IF-B). A control section 115 as shown in FIG. 3 acquires the traffic information, such as the number of transmission/reception frames (the number of packets) or the transfer rate, concerning the wired LAN IF 116 (as indicated by a broken-line arrow in the figure), and performs relay control of controlling the transfer allocation ratio between the power line communication (PLC) IF 117 and the wireless LAN IF 118 based on this traffic information. The power line communication (PLC) IF 117 is connected to a commercial AC socket 131 so as to be capable of communicating with a power line communication (PLC) IF of another communication interface coupling apparatus, whereas the wireless LAN IF 118 is connected to a wireless antenna 132 so as to be capable of communicating with a wireless LAN IF of the other communication interface coupling apparatus.

Returning to FIG. 1, the case where frames (packets) are transmitted from the network 120 to the network 220 as shown in FIG. 1 will now be described below. The frames from the network 120 are received by the primary communication interface (i.e., the primary IF 106) in the communication interface coupling apparatus 100, and each of the frames is transferred to one of the two relay communication interfaces (i.e., the relay IF-A 107 and the relay IF-B 108). At this time, the transfer allocation ratio for the frames is determined and controlled based on the traffic information supplied from the primary communication interface (i.e., the primary IF 106) as described above. Then, the frames are transferred from the relay IF-A 107 and the relay IF-B 108 to the corresponding relay communication interfaces (i.e., the relay IF-A 207 and the relay IF-B 208, respectively) in the communication interface coupling apparatus 200 through the relay section 150. The frames received by the relay IF-A 207 and the relay IF-B 208 are transferred to the primary communication interface (i.e., the primary IF 206) and then transmitted to the network 220. The transmission of the frames (packets) from the network 220 to the network 120 is performed in a similar manner. That is, the frames are received by the primary IF 206 in the communication interface coupling apparatus 200, and each of the frames is transferred to one of the relay IF-A 207 and the relay IF-B 208. Then, the frames are transferred from the relay IF-A 207 and the relay IF-B 208 to the relay IF-A 107 and the relay IF-B 108, respectively, in the communication interface coupling apparatus 100 through the relay section 150. Then, the frames received by the relay IF-A 107 and the relay IF-B 108 are transferred to the primary IF 106 and then transmitted to the network 120.

Figure 4:
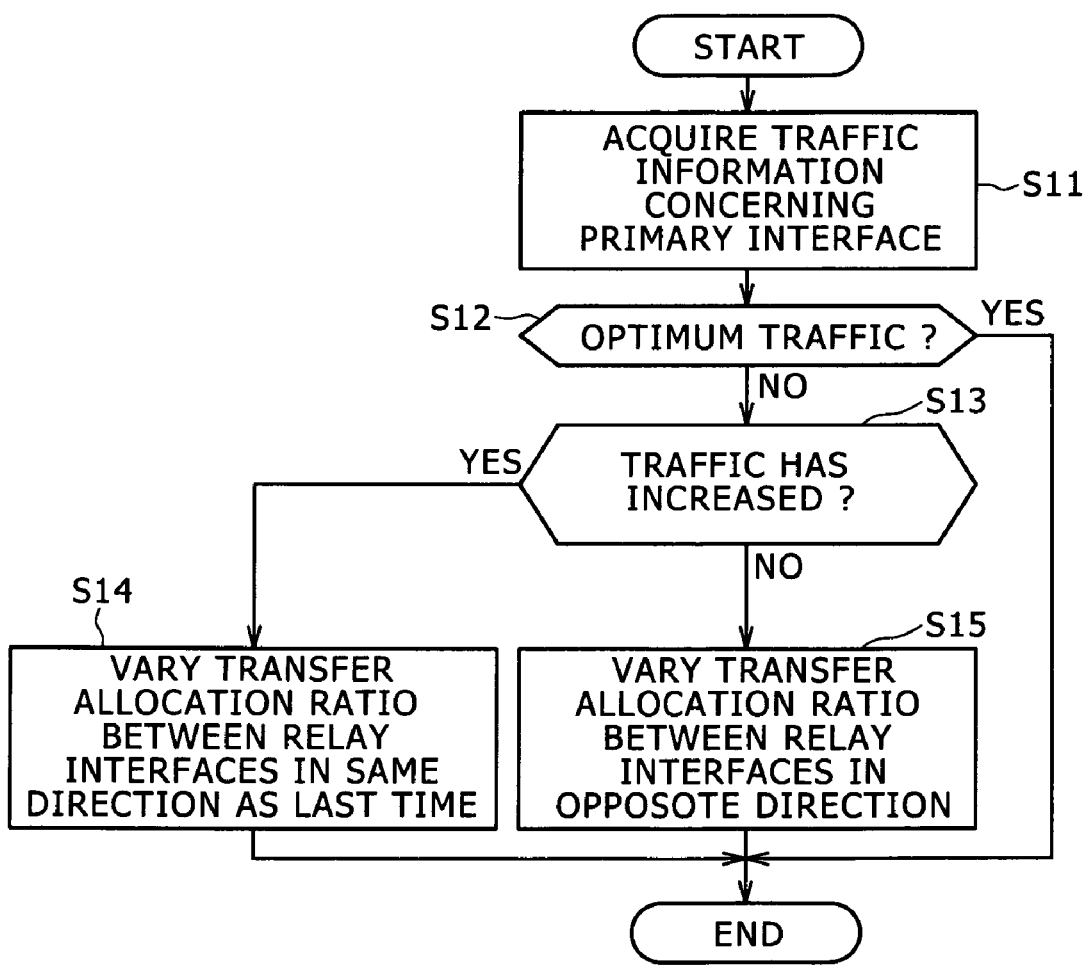
FIG. 4 is a flowchart illustrating an exemplary operation of controlling a frame transfer allocation ratio between relay interfaces according to one embodiment of the present invention.

FIG. 4 is a flowchart illustrating an exemplary operation of controlling the frame transfer allocation ratio between the relay interfaces. This operation of controlling the transfer allocation ratio is typically activated periodically, but may be activated based on some trigger or at random.

Referring to FIG. 4, if the operation of controlling the frame transfer allocation ratio is activated, the traffic information (e.g., the number of frames transmitted or received, the transfer rate, etc.) concerning the primary interface (i.e., the primary IF) is acquired at step S11. Based on this traffic information, it is determined whether end-to-end traffic (i.e., traffic between connection terminals of each communication interface coupling apparatus to the network) is good with the current frame transfer allocation ratio. If the end-to-end traffic is good, the current frame transfer allocation ratio is maintained, whereas if the end-to-end traffic is poor, the frame transfer allocation ratio is varied. That is, while the change in the end-to-end traffic is checked each time the frame transfer allocation ratio is varied, the optimum frame transfer allocation ratio is aimed at recursively. In the case where the end-to-end traffic has been determined to be poor based on the traffic information and the frame transfer allocation ratio is to be varied, the control of the frame transfer allocation ratio is performed in the following manners, for example. One exemplary manner of the control of the frame transfer allocation ratio is as follows: if the end-to-end traffic has become poor as a result of varying the transfer allocation ratio in one direction, the transfer allocation ratio is varied in the opposite direction. Another manner of the control of the frame transfer allocation ratio is as follows: the transfer allocation ratio is set at random. The latter manner is suitable when the former manner, where the allocation ratio is varied in one or the other direction recursively, does not work well. The latter manner is also suitable for a trial mode when there is a desire to achieve the optimum allocation ratio quickly. Steps S12 to S15 in FIG. 4 represent a specific example of the former manner.

At step S12, it is determined whether or not the optimum traffic has been achieved. The achievement of the optimum traffic is determined, for example, when a change in the traffic volume as derived from the above traffic information falls within a predetermined range, or when the traffic volume has alternately increased and decreased for longer than a predetermined period of time as a result of the variations of the transfer allocation ratio in accordance with the traffic information. When the optimum traffic has been achieved (Yes at step S12), this operation is finished without varying the allocation ratio. Meanwhile, when the optimum traffic has not been achieved (No at step S12), control proceeds to step S13, and it is determined whether or not the traffic has increased.

If it is determined at step S13 that the traffic volume has increased (Yes), control proceeds to step S14, and the transfer allocation ratio between the relay interfaces is varied in the same direction as that in which the transfer allocation ratio was varied the last time. Specifically, in the case where the transfer allocation ratio was varied the last time in such a direction that a greater percentage of frames would be transferred to one relay interface (e.g., the relay IF-A) and a smaller percentage of frames would be transferred to the other relay interface (e.g., the relay IF-B), the transfer allocation ratio is varied this time in the same direction again, so that a still greater percentage of frames will be transferred to the relay IF-A and a still smaller percentage of frames will be transferred to the relay IF-B.

Meanwhile, if it is determined at step S13 that the traffic volume has not increased (No), control proceeds to step S15, and the transfer allocation ratio between the relay interfaces is varied in the opposite direction to that in which the transfer allocation ratio was varied the last time. Specifically, in the case where the transfer allocation ratio was varied the last time in such a direction that a greater percentage of frames would be transferred to one relay interface (e.g., the relay IF-A) and a smaller percentage of frames would be transferred to the other relay interface (e.g., the relay IF-B), the transfer allocation ratio is varied this time in the opposite direction, so that a smaller percentage of frames will be transferred to the relay IF-A and a greater percentage of frames will be transferred to the relay IF-B.

FIGS. 5A to 5C are time charts illustrating an example of the operation of the flowchart as shown in FIG. 4. FIG. 5A shows the traffic volume of the primary interface (i.e., the primary IF), FIG. 5B shows the percentage of the frames allocated to one of the relay interfaces (e.g., the relay IF-A), and FIG. 5C shows the percentage of the frames allocated to the other relay interface (e.g., the relay IF-B).

Referring to FIGS. 5A to 5C, at time t0, when the transfer allocation ratio between the relay IF-A and the relay IF-B has been 1:1, the percentage of the frames allocated to the relay IF-A is varied from 50% to 60%, and the percentage of the frames allocated to the relay IF-B is varied from 50% to 40%. As a result, the traffic volume increases as shown in FIG. 5A. Then, at time t1, when the operation of controlling the transfer allocation ratio as shown in FIG. 4 is activated next time, the determination of Yes is made at step S13 in FIG. 4 because the traffic volume has increased, and accordingly, control proceeds to step S14, and the transfer allocation ratio between the relay interfaces is varied in the same direction as that in which the transfer allocation ratio was varied the last time. In the example as illustrated in FIGS. 5B and 5C, the percentage of the frames allocated to the relay IF-A is increased to 70%, while the percentage of the frames allocated to the relay IF-B is decreased to 30%. As a result, the traffic volume increases as shown in FIG. 5A. Then, at time t2, when the operation of controlling the transfer allocation ratio is activated next time, the determination of Yes is made at step S13 because the traffic volume has increased, and accordingly, control proceeds to step S14, and the transfer allocation ratio between the relay interfaces is varied in the same direction as that in which the transfer allocation ratio was varied the last time. In the example as illustrated in FIGS. 5A to 5C, the percentage of the frames allocated to the relay IF-A is increased to 80%, while the percentage of the frames allocated to the relay IF-B is decreased to 20%. As a result, the traffic volume decreases as shown in FIG. 5A.

Then, at time t3, when the operation of controlling the transfer allocation ratio is activated next time, the determination of No is made at step S13 in FIG. 4 because the traffic volume has decreased, and accordingly, control proceeds to step S15, and the transfer allocation ratio between the relay interfaces is varied in the opposite direction to that in which the transfer allocation ratio was varied the last time (i.e., at time t2). In the example as illustrated in FIGS. 5B and 5C, at time t3, the percentage of the frames allocated to the relay IF-A is decreased to 70%, while the percentage of the frames allocated to the relay IF-B is increased to 30%. As a result, the traffic volume increases as shown in FIG. 5A. Then, at time t4, when the operation of controlling the transfer allocation ratio is activated next time, the determination of Yes is made at step S13 because the traffic volume has increased, and accordingly, control proceeds to step S14, and the transfer allocation ratio between the relay interfaces is varied in the same direction as that in which the transfer allocation ratio was varied the last time (i.e., at time t3). In this case, because the percentage of the frames allocated to the relay IF-A was decreased and the percentage of the frames allocated to the relay IF-B was increased the last time (i.e., at time t3), the percentage of the frames allocated to the relay IF-A is decreased to 60% and the percentage of the frames allocated to the relay IF-B is increased to 40% at time t4 in the example as illustrated in FIGS. 5B and 5C. As a result, the traffic volume decreases as shown in FIG. 5A.

Then, at time t5, when the operation of controlling the transfer allocation ratio is activated next time, the determination of No is made at step S13 in FIG. 4 because the traffic volume has decreased, and accordingly, control proceeds to step S15, and the transfer allocation ratio between the relay interfaces is varied in the opposite direction to that in which the transfer allocation ratio was varied the last time (i.e., at time t4). In the example as illustrated in FIGS. 5B to 5C, the percentage of the frames allocated to the relay IF-A is increased to 70%, while the percentage of the frames allocated to the relay IF-B is decreased to 30%.

Note that, if the transfer allocation ratio has been increased and decreased alternately for longer than a predetermined period of time as a result of the above control operation, it may be determined that the optimum traffic has been achieved, i.e., the determination of Yes may be made at step S12 in FIG. 4, so that the control operation is finished without further varying the transfer allocation ratio.

According to the above-described embodiment of the present invention, in the communication apparatus (i.e., the communication interface coupling apparatus) that has a plurality of relay interfaces whose communication quality is not necessarily steady, it is possible to determine the appropriate path to which the data should be transmitted more easily, i.e., only by acquiring the traffic information concerning the primary communication interface without the need to detect the traffic information concerning the plurality of physical interfaces (i.e., the relay communication interfaces) individually, in order to secure higher communication quality. This will lead to an increase in end-to-end throughput.

Next, another example of the control of the frame transfer allocation ratio based on the traffic information will now be described below. In this example, the size of the frames (packets) is used. That is, as the traffic information concerning the primary communication interface (i.e., the primary IF), the size of the communication frames (packets) is acquired, and the transfer allocation ratio is controlled in accordance with the size of the frames as detected. Specifically, a table is prepared in which a plurality of transfer allocation ratios between the two relay interfaces are set so as to be associated with communication frame sizes, and the transfer allocation ratio is controlled in accordance with the size of the frames supplied from the primary communication interface (i.e., the primary IF) with reference to the table. The plurality of transfer allocation ratios associated with the frame sizes as set in the table are as follows, for example:

Frame sizes of 1 to 100 bytes 1:1
Frame sizes of 101 to 500 bytes 4:3
Frame sizes of 501 to 1000 bytes 4:1
Frame sizes of 1001 to 1500 bytes 5:1

The above table is simply one example of such a table. As noted previously, the transfer allocation ratio may be varied dynamically.

The setting of the plurality of transfer allocation ratios associated with the different frame sizes is suitable for the case where frames with a particular size are allocated appropriately between the two relay interfaces having different attributes and characteristics.

For example, suppose that one of the relay interfaces has a high physical rate (data transfer rate) but involves a relatively long delay, while the other relay interface has a low physical rate but involves a short delay. In this case, when packets with a small size, e.g., about 80 bytes, such as acknowledge (Ack) packets in the transmission control protocol (TCP) standard, are transferred, for example, it is preferable that the percentage of the packets allocated to the latter relay interface be high, because low delay and high responsivity are desirable. On the other hand, when packets with a large size, e.g., close to 1500 bytes, which is the maximum data size in the TCP standard, are transferred, it is preferable that the percentage of the packets allocated to the former relay interface be high.

It is assumed here that the relay interfaces are the power line communication (PLC) IF and the wireless LAN IF, for example. While there are a variety of known standards for the wireless LAN IF, the power line communication (PLC) IF is generally capable of transferring packets with larger sizes, i.e., has a higher physical rate (data transfer rate), and involves a longer delay than the wireless LAN IF. Therefore, when the packets with small sizes, such as the Ack packets in the TCP standard, are transferred, it is preferable that the percentage of the packets allocated to the wireless LAN IF be high, in order to increase the responsivity, whereas when the packets with a large size are transferred, it is preferable that the percentage of the packets allocated to the power line communication (PLC) IF be high.

As described above, in accordance with the communication frame size as obtained from the primary interface, the transfer allocation ratio is controlled so as to be adapted to combined characteristics of the two relay interfaces. As a result, higher communication quality is secured, and data transfer throughput will be increased.

The communication control method as described above can be implemented as a program for causing a computer to perform each step, and also may be provided as a computer-readable storage medium having such a program stored therein.

It should be understood by those skilled in the art that various modifications, combinations, sub-combinations and alterations may occur depending on design requirements and other factors insofar as they are within the scope of the appended claims or the equivalents thereof.

What is claimed is:

1. A communication control method employed by a communication apparatus including a primary communication interface and a plurality of relay communication interfaces and having a communication interface coupling function of transferring a transmission/reception frame of the primary communication interface through one of the plurality of relay communication interfaces, the method comprising the steps of:

acquiring traffic information concerning the primary communication interface; and using a control device having a central processing unit to dynamically vary a transfer allocation ratio between the plurality of relay communication interfaces based on the traffic information so as to increase a traffic volume through the primary communication interface.

2. The communication control method according to claim 1, wherein the transfer allocation ratio is varied recursively based on the traffic information concerning the primary communication interface.

3. The communication control method according to claim 1, wherein, the primary communication interface is a wired LAN interface, and the plurality of relay communication interfaces include a power line communication interface and a wireless LAN interface.

4. The communication control method according to claim 1, wherein the transfer allocation ratio is varied at random.

5. The communication control method according to claim 1, wherein the transfer allocation ratio is varied to different ratios depending on a size of the transmission/reception frame obtained as the traffic information concerning the primary communication interface.

6. A communication control method employed by a communication apparatus including a primary communication interface and a plurality of relay communication interfaces and having a communication interface coupling function of transferring a transmission/reception frame of the primary communication interface through one of the plurality of relay communication interfaces, the method comprising the steps of:

acquiring traffic information concerning the primary communication interface; and using a control device having a central processing unit to dynamically vary a transfer allocation ratio between the plurality of relay communication interfaces based on the traffic information, wherein the transfer allocation ratio is varied recursively based on the traffic information concerning the primary communication interface, and wherein, when a traffic volume of the primary communication interface has increased after the transfer allocation ratio between the plurality of relay communication interfaces is varied, the transfer allocation ratio is varied next time in the same direction as that in which the transfer allocation ratio was varied the last time, and when the traffic volume of the primary communication interface has decreased after the transfer allocation ratio between the plurality of relay communication interfaces is varied, the transfer allocation ratio is varied next time in an opposite direction to that in which the transfer allocation ratio was varied the last time.

7. A communication apparatus, comprising:

a primary communication interface;

a plurality of relay communication interfaces; and a control device to acquire traffic information concerning said primary communication interface, and dynamically vary a transfer allocation ratio between said plurality of relay communication interfaces based on the traffic information so as to increase a traffic volume through the primary communication interface, the communication apparatus having a communication interface coupling function of transferring a transmission/reception frame of said primary communication interface through one of said plurality of relay communication interfaces.

8. A communication system, comprising two or more communication apparatuses, each of said two or more communication apparatuses including a primary communication interface, a plurality of relay communication interfaces, and a control device to acquire traffic information concerning the primary communication interface, and dynamically vary a transfer allocation ratio between the plurality of relay communication interfaces based on the traffic information so as to increase a traffic volume through the primary communication interface, each of said two or more communication apparatuses having a communication interface coupling function of transferring a transmission/reception frame of the primary communication interface through one of the plurality of relay communication interfaces, each of the plurality of relay communication interfaces of each of said two or more communication apparatuses being connected to a corresponding one of the plurality of relay communication interfaces of another of said two or more communication apparatuses.

* * * * *